Aug. 23, 1927.

F. DOWRELIO

BRAKE TESTER

Filed Nov. 18, 1926

1,639,884

INVENTOR.
Frank Dowrelio
BY Townsend Loftin & Abbett
ATTORNEYS.

Patented Aug. 23, 1927.

1,639,884

UNITED STATES PATENT OFFICE.

FRANK DOWRELIO, OF OAKLAND, CALIFORNIA.

BRAKE TESTER.

Application filed November 18, 1926. Serial No. 149,027.

This invention relates to brake adjusting devices and particularly pertains to a tester for accurately determining the resistance of automobile brakes so that the latter may be equalized on all the wheels of an automotive vehicle.

It is the principal object of the present invention to provide a simple and inexpensive device which may be engaged with a wheel of a vehicle to rotate the same against the action of its brake to accurately indicate the amount of torque required to initiate rotation of the wheel when the brake is set.

In carrying out this object into practice I provide a two-part lever which may be detachably engaged with a wheel of an automobile for rotating it. This lever is formed in two relatively movably parts between which a pressure gage is interposed, so that the torque required to initiate rotation of the wheel against the action of its brake will be visibly indicated.

One form which the invention may assume is exemplified in the following description and illustrated by way of example in the accompanying drawings, in which.

In order to obtain proper braking action of automobile brakes, it is necessary that the brake on all of the wheels be equalized. To accomplish this it is necessary that the resistance of the brake on each wheel be exactly the same. By means of my present invention I have provided a device which will accurately determine the torque required to initiate rotation of the wheel against the action of its brake. In this manner the brakes may be adjusted so that their resistance will be equal.

Figure 1:
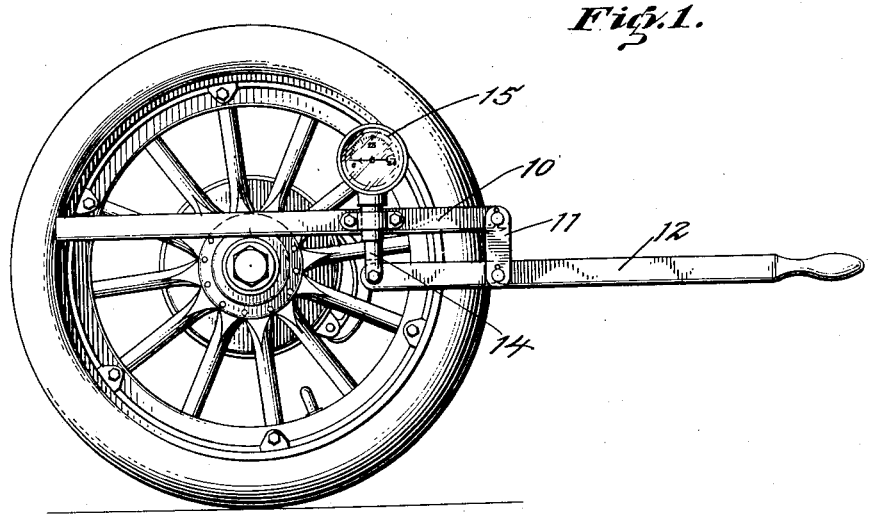
Fig. 1 is a view of an automobile wheel showing the manner in which the device is connected therewith for operation.
Figure 2:
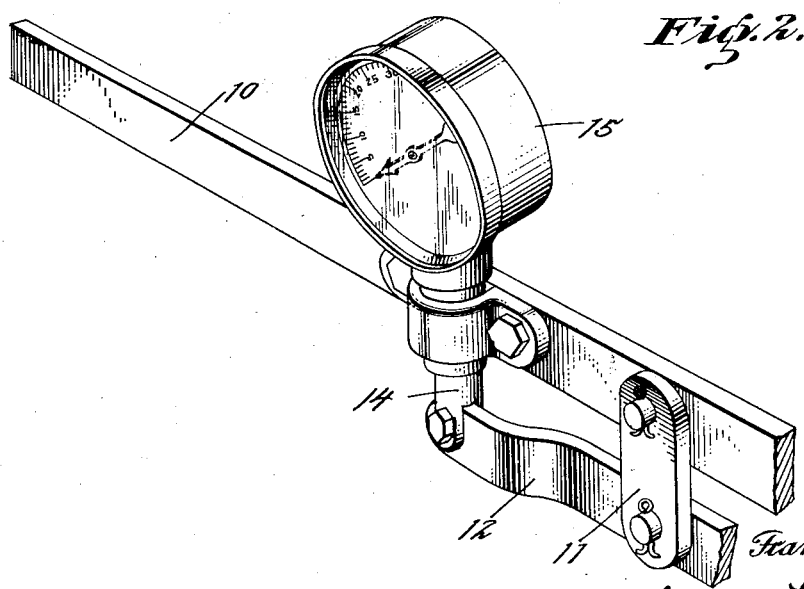
Fig. 2 is a fragmentary view in perspective showing the manner in which the pressure gage is connected to the adjacent parts of the lever.

Reference being had to Fig. 1 it is seen that I have provided a rigid lever 10 of a length that it may be disposed diametrically of an automobile wheel. This lever rests upon the hub of the vehicle and one of its ends is adapted to be engaged with one of the rim lugs. The other end of the wheel lever is pivotally connected to a vertical link 11 which depends downwardly and is pivotally connected to a handle 12. The pivotal connection between the link 11 and the handle 12 occurs intermediate the ends of the handle as shown. The inner end of the handle pivotally connects with a plunger 14 of a pressure gage 15.

The pressure gage 15 is rigidly secured on the wheel lever 10 so that oscillation of the handle will vertically reciprocate the plunger in the pressure gage. This pressure gage may be of any preferred design which will translate the pressure applied to the end of the handle into pounds pressure.

In operation of the device, the wheels of the vehicle are disengaged from the ground so that they may rotate. The brakes are then set. After this has been done the lever is applied to the wheel, as shown in Fig. 1, and pressure is brought to bear on the outer end of the handle to turn the wheel. When sufficient pressure has been applied to the handle to initiate rotation of the wheel, the reading of the pressure gage is noted and the brakes of all the wheels are adjusted so that they will commence rotating under the same pressure.

By this means, a desired resistance of the brakes may be obtained and all of the brakes accurately set to offer the same resistance. This results in perfect equalization of the braking action of all the wheels.

The link connection between the handle and the lever bar permits the plunger of the pressure gage to move in a perfect vertical direction, eliminating wear and other disadvantageous effects.

It is obvious that I have provided a simple and inexpensive device for testing brakes, which will be comparatively inexpensive to manufacture, easily operated and capable of use in adjusting the brakes. Likewise, that the braking action of all the wheels of the vehicle may be determined and equalized.

While I have shown the preferred form of my invention, it is to be understood that various changes may be made in its construction by those skilled in the art without departing from the spirit of the invention, as defined in the appended claim.

Having thus described my invention, what I claim and desire to secure by Letters Patent is:

A brake testing device comprising a lever adapted to be arranged diametrically of a wheel over the hub thereof, one end of the lever being adapted to engage a rim lug of the wheel, a handle disposed substantially parallel to the lever, a link connecting the lever to the handle, the point of connection between the link and the handle being disposed intermediate the ends of the latter, a pressure gage secured to the lever, said pressure gage having a reciprocable plunger, a connection between said plunger and the inner end of the handle whereby pressure brought to bear on the outer end of the handle will operate the gage, and through the gage impart turning movement to the lever to rotate the wheel.

FRANK DOWRELIO.